United States Patent
Choo et al.

(10) Patent No.: US 9,294,703 B2
(45) Date of Patent: Mar. 22, 2016

(54) IMAGE SENSOR INCLUDING DATA TRANSMISSION CIRCUIT HAVING SPLIT BUS SEGMENTS

(71) Applicant: Samsung Electronics Co., Ltd., Suwon-Si, Gyeonggi-Do (KR)

(72) Inventors: Kyo Jin Choo, Seoul (KR); Eun Young Jin, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 157 days.

(21) Appl. No.: 14/095,082

(22) Filed: Dec. 3, 2013

(65) Prior Publication Data

US 2014/0151534 A1 Jun. 5, 2014

Related U.S. Application Data

(60) Provisional application No. 61/732,665, filed on Dec. 3, 2012.

(30) Foreign Application Priority Data

Mar. 15, 2013 (KR) ........................ 10-2013-0028024

(51) Int. Cl.
*H04L 12/40* (2006.01)
*H04N 5/378* (2011.01)
*H04N 5/374* (2011.01)

(52) U.S. Cl.
CPC ............. *H04N 5/378* (2013.01); *H04N 5/3742* (2013.01)

(58) Field of Classification Search
CPC ....... H04L 12/40; H04N 5/3742; H04N 5/378
USPC ................... 250/214 R, 208.1; 348/294–319; 257/290–292, 440
See application file for complete search history.

(56) References Cited

U.S. PATENT DOCUMENTS

| | | | |
|---|---|---|---|
| 4,983,010 A * | 1/1991 | Popp | 398/61 |
| 7,015,966 B1 | 3/2006 | Lin | |
| 7,265,703 B2 | 9/2007 | Sasaki et al. | |
| 7,283,080 B2 | 10/2007 | Kirsch | |
| 7,339,151 B2 * | 3/2008 | Mabuchi | 250/208.1 |
| 7,408,443 B2 | 8/2008 | Nam | |
| 7,436,343 B2 | 10/2008 | Ichikawa | |
| 7,514,663 B2 * | 4/2009 | Yagi et al. | 250/208.1 |
| 7,565,033 B2 | 7/2009 | Hanson et al. | |
| 7,570,293 B2 | 8/2009 | Nakamura | |
| 7,864,237 B2 | 1/2011 | Muramatsu | |
| 8,120,685 B2 | 2/2012 | Lee | |
| 8,243,179 B2 | 8/2012 | Shoho et al. | |
| 2012/0007653 A1 | 1/2012 | Choo et al. | |
| 2012/0049042 A1 | 3/2012 | Lim et al. | |

* cited by examiner

*Primary Examiner* — Que T Le
(74) *Attorney, Agent, or Firm* — Harness, Dickey & Pierce, P.L.C.

(57) ABSTRACT

A data transmission circuit of an image sensor includes first to Kth bus segments, and first to Kth data regeneration circuits respectively connected to the first to Kth bus segments and the first to (K−1)th data regeneration circuits respectively connected to the second to Kth bus segments. Each of the first to Kth data regeneration circuits may be embodied as one of a buffer, a logic gate, and a synchronous circuit operating in response to a clock signal.

20 Claims, 12 Drawing Sheets

IMAGE SENSOR INCLUDING DATA TRANSMISSION CIRCUIT HAVING SPLIT BUS SEGMENTS

CROSS-REFERENCE TO RELATED APPLICATIONS

This application claims priority under 35 U.S.C. §119(e) to U.S. provisional patent application No. 61/732,665 filed on Dec. 3, 2012, and under 35 U.S.C. §119(a) to Korean Patent Application No. 10-2013-0028024 filed on Mar. 15, 2013, the entire contents of each of which are hereby incorporated by reference.

BACKGROUND

Example embodiments of the present inventive concepts relate to an image sensor, and more particularly to an image sensor capable of continuously transmitting data using a plurality of bus segments and a plurality of data regeneration circuits connecting the plurality of bus segments, and/or a portable electronic device having the image sensor.

A CMOS image sensor has been widely used. In particular, the CMOS image sensor is widely used in a portable electronic device. The CMOS image sensor uses a transmission line, for example, a data bus, for transmitting a signal corresponding to a pixel signal output from a pixel array. The signal transmitted through the transmission line is affected by an RC time constant characteristics of the transmission line. Accordingly, the length and the area of the transmission line are determined considering the RC time constant.

SUMMARY

According to an example embodiment, a data transmission circuit of an image sensor includes first to Kth bus segments, and first to Kth data regeneration circuits respectively connected to the first to Kth bus segments, and the first to (K−1)th data regeneration circuits respectively connected to the second to Kth bus segments.

According to an example embodiment, each of the first to Kth data regeneration circuits may be embodied as one of a buffer, a logic gate, and a synchronous circuit operating in response to a clock signal.

The Kth data regeneration circuit is configured to output data of the Kth bus segment among first to Kth bus segments as serial data. The data transmission circuit may further include first to Kth address transmission circuits, which respectively transmits addresses related to data transmitted through the first to Kth bus segments. The first to Kth address transmission circuits may be connected to each other in series.

According to an example embodiment, each of the first to Kth address transmission circuits may be embodied as one of a buffer, a logic gate, and a synchronous circuit operating in response to a clock signal.

A transmission timing of the data and a transmission timing of the address may be synchronized with each other. According to an example embodiment, each of the first to Kth data regeneration circuits may transmit respective data of each of the first to Kth bus segments in one direction. According to another example embodiment, each of the first to Kth data regeneration circuits may bi-directionally transmit respective data of the first to Kth bus segments.

According to an example embodiment, a portable electronic device includes an image sensor, and a processor configured to control an operation of the image sensor. The image sensor includes a pixel array, an analog-to-digital converter, and a data transmission circuit. The analog-to-digital converter circuit is configured to convert an analog pixel signal output from the pixel array to a digital signal. The data transmission circuit is configured to transmit data related to the digital signal. The data transmission circuit includes first to Kth bus segments and first to Kth data regeneration circuits respectively connected to the first to Kth bus segments and the first to (K−1)th data regeneration circuits respectively connected to the second to Kth bus segments.

Data of the first to Kth bus segments may be sequentially transmitted through the first to Kth data regeneration circuits. Data of each of the first to Kth bus segments may be sequentially transmitted through the first to Kth data regeneration circuits operating in response to a clock signal.

According to an example embodiment, an image sensor includes a pixel array, an analog-to-digital converter configured to convert an analog pixel signal output from the pixel array to a digital signal, and a data transmission circuit configured to transmit data related to the digital signal. The data transmission circuit includes first to Kth bus segments, and first to Kth data regeneration circuits respectively connected to the first to Kth bus segments and the first to (K−1)th data regeneration circuits respectively connected to the second to Kth bus segments.

The image sensor may include a digital processing unit, which is configured to generate addresses and is configured to process data serially output from the data transmission circuit.

The image sensor may include an encoding converter between the digital processing unit and the data transmission circuit and the encoding converter may be configured to encode and convert a first format code into a second format code.

The first format code may be one of one-hot, binary code, gray code, and thermometer code, and the second format code may be the other one of the one-hot, the binary code, the gray code, and the thermometer code.

A sum of lengths of the first to Kth bus segments may be smaller than a length of the pixel array in an arrangement direction of the first to Kth bus segments.

BRIEF DESCRIPTION OF THE DRAWINGS

These and/or other aspects and advantages of the present general inventive concepts will become apparent and more readily appreciated from the following description of the embodiments, taken in conjunction with the accompanying drawings of which.

DETAILED DESCRIPTION

Figure 1:
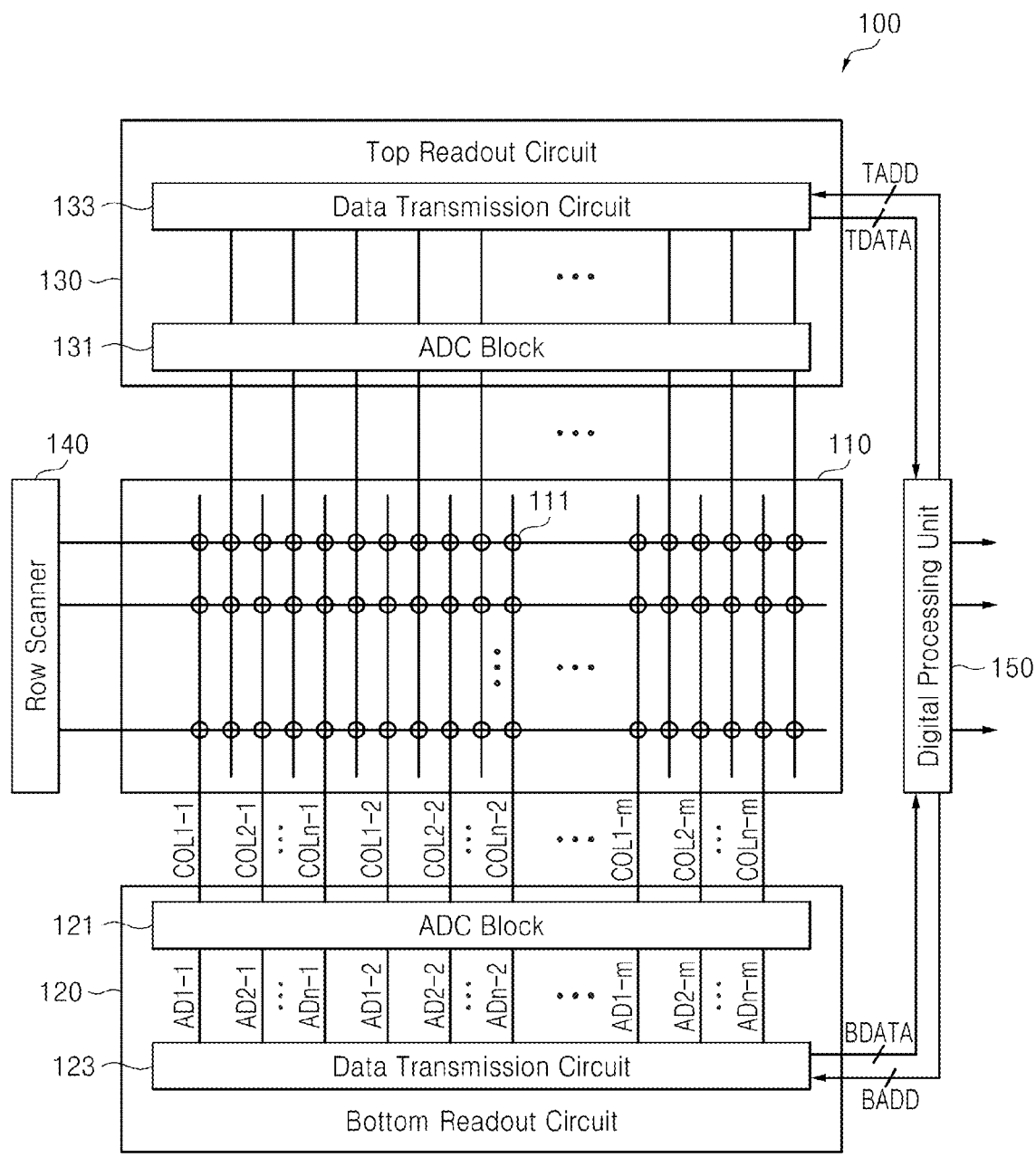
FIG. 1 is a block diagram of an image sensor according to one example embodiment.

The present inventive concepts now will be described more fully hereinafter with reference to the accompanying drawings, in which some example embodiments are shown. Example embodiments may, however, be embodied in many different forms and should not be construed as limited to the example embodiments set forth herein. Rather, these example embodiments are merely provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, example embodiments will be explained in further detail with reference to the accompanying drawings.

FIG. 1 is a block diagram of an image sensor according to one example embodiment. Referring to FIG. 1, an image sensor 100 includes a pixel array 110, a first readout circuit 120, a second readout circuit 130, a row scanner 140, and a digital processing unit 150.

The pixel array (or active pixel sensor array) 110 includes a plurality of pixels 111 embodied in a form of matrix.

The first readout circuit 120 also may be referred to as a bottom readout circuit. The first readout circuit 20 processes analog pixel signals COL1-1 to COLn-m (which are output from a first group of columns of the pixel array 110), where n and m are natural numbers, and transmits first data BDATA, which corresponds to processed analog pixel signals, to the digital processing unit 150.

The first readout circuit 120 includes an analog-to-digital converter (ADC) block 121 and a data transmission circuit 123.

The ADC block 121 converts each analog pixel signal COL1-1 to COLn-1, COL1-2 to COLn-2, . . . , and COL1-$m$ to COLn-m (i.e., output through each column of the pixel array 110) into each digital signal AD1-1 to ADn-1, AD1-2 to ADn-2, . . . , and AD1-$m$ to ADn-m, respectively.

According to some example embodiments, the ADC block 121 may convert each analog pixel signal COL1-1 to COLn- 1, COL1-2 to COLn-2, . . . , and COL1-*m*, to COLn-m into each digital signal AD1-1 to ADn-1, AD1-2 to ADn-2, . . . , and AD1-*m* to ADn-m, respectively, using each single-slope ADC.

According to some other example embodiments, the ADC block 121 may perform a correlated double sampling (CDS) on each analog pixel signal COL1-1 to COLn-1, COL1-2 to COLn-2, . . . , and COL1-*m* to COLn-m, and generate each digital signal AD1-1 to ADn-1, AD1-2 to ADn-2, . . . , and AD1-*m* to ADn-m according to a result of the CDS.

The data transmission circuit 123 may serialize parallel digital signals AD1-1 to ADn-1, AD1-2 to ADn-2, . . . , and AD1-*m* to ADn-m based on a first address BADD, and transmit the serialized first data BDATA to the digital processing unit 150. According to some example embodiments, the first address BADD may be, e.g., binary code, gray code, one-hot, thermometer code, or mixed code. For example, the first address BADD may be a mixed code, which includes a first code portion and a second code portion. The first code portion may be one of binary code and gray code, and the second code portion may be the other of binary code and gray code. The first address BADD is one of a plurality of control signals output from the digital processing unit 150.

The second readout circuit 130 also may be referred to as a top readout circuit. The second readout circuit 130 processes analog pixel signals (which are output from a second group of columns of the pixel array 110) and transmits second data TDATA, which corresponds to processed analog pixel signals to the digital processing unit 150.

A structure and an operation of the second readout circuit 130 may be the same as the structure and operation of the first readout circuit 120. For example, a structure and an operation of each ADC block 121 and 131 may be substantially the same, and a structure and an operation of each data transmission circuit 123 and 133 may be substantially the same.

The data transmission circuit 133 may serialize parallel digital signals based on the second address TADD, and transmit the serialized second data TDATA to the digital processing unit 150. For example, each data transmission circuit 123 and 133 may process data according to a pipe lining method.

According to some example embodiments, the second address TADD may be, e.g., a binary code, gray code, one-hot, thermometer code, or mixed code. For example, the second address TADD may be a mixed code, which includes a first code portion and a second code portion. The first code portion may be one of binary code and gray code, and the second code portion is the other of the binary code and the gray code. The second address TADD is one of a plurality of control signals output from the digital processing unit 150.

For example, the first readout circuit 120 and the second readout circuit 130 may be embodied in an opposite side to each other by interposing the pixel array 110 therebetween.

The first group of columns may be odd numbered columns, and the second group of columns may be even numbered columns.

The row scanner 140 controls an operation of pixels 111 arranged in each row direction. For example, according to a control of the row scanner 140, each pixel 111 arranged in each row direction may transmit each analog pixel signal to each column. The row scanner 140 may include a function of a row decoder and/or a function of a row driver.

The digital processing unit 150 may generate each address BADD and TADD, and process each serial data BDATA and TDATA.

Figure 2:
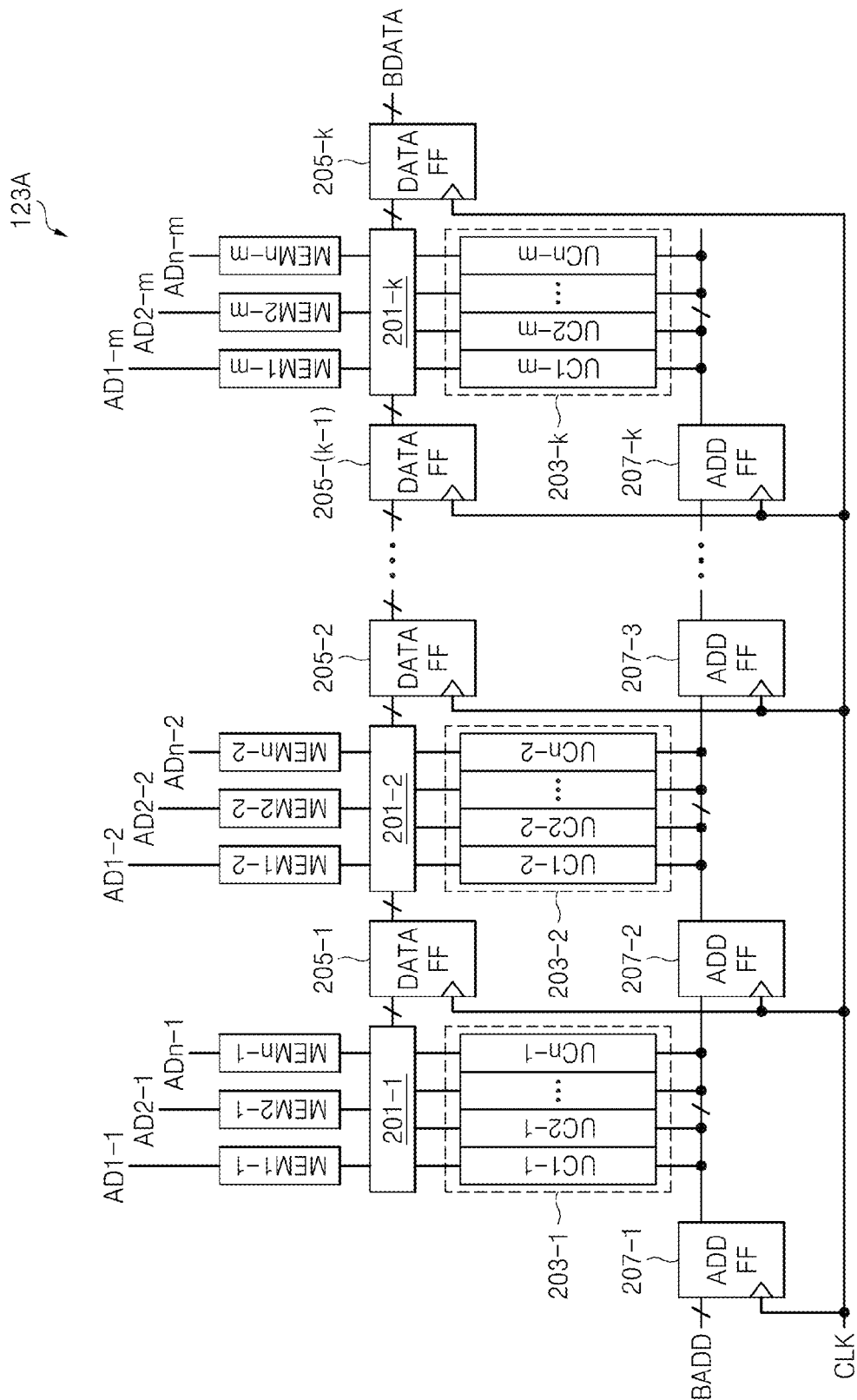
FIG. 2 is a block diagram illustrating an example embodiment of a data transmission circuit illustrated in FIG. 1.

FIG. 2 is a block diagram illustrating an example embodiment of a data transmission circuit illustrated in FIG. 1. Referring to FIG. 2, a data transmission circuit 123A includes a plurality of memories MEM1-1 to MEMn-1, MEM1-2 to MEMn-2, . . . , MEM1-*m* to MEMn-m, a plurality of bus segments 201-1 to 201-*k*, a plurality of banks 203-1 to 203-*k*, where k is a natural number, a plurality of data regeneration circuits 205-1 to 205-*k*, and a plurality of address transmission circuits 207-1 to 207-*k*.

Each of the plurality of memories MEM1-1 to MEMn-1, MEM1-2 to MEMn-2, . . . , and MEM1-*m* to MEMn-m receives and stores each of the parallel digital signals AD1-1 to ADn-1, AD1-2 to ADn-2, . . . , and AD1-*m* to ADn-m. According to some example embodiments, each of the plurality of memories MEM1-1 to MEMn-1, MEM1-2 to MEMn-2, . . . , MEM1-*m* to MEMn-m may be embodied as a static random access memory (SRAM), and output a signal or signals which are complementary to each other.

Each of the plurality of bus segments 201-1 to 201-*k* may be arranged in a row at a constant interval. Each of the bus segments 201-1 to 201-*k* may be a transmission line (e.g., metal or wire) configured to transmit a signal or data. For example, a sum of lengths of all of the bus segments 201-1 to 201-*k* may be smaller than a length of the pixel array 110 in a length direction (e.g., an arrangement direction) of the bus segments.

Each of the plurality of banks 203-1 to 203-*k* may include a plurality of unit cells. Each of the plurality of unit cells UC1-1 to UCn-m may transmit signals or data related to each of the parallel digital signals AD1-1 to ADn-m to each of the plurality of bus segments 201-1 to 201-*k*.

Each of the plurality of data regeneration circuits 205-1 to 205-(*k*−1) may transmit data of a previous bus segment to a next bus segment in response to a clock signal CLK. For example, the clock signal CLK may be a control signal output from the digital processing unit 150.

For example, in response to the clock signal CLK, the data regeneration circuit 205-1 transmits data of the previous bus segment 201-1 to the next bus segment 201-2, the data regeneration circuit 205-2 transmits data of the previous bus segment 201-2 to the next bus segment, and the data regeneration circuit 205-(*k*−1) transmits data of the previous bus segment to the next bus segment 201-*k*.

The last data regeneration circuit 205-*k* transmits data of the last bus segment 201-*k* to the digital processing unit 150 as the serialized first data BDATA. For example, each of the plurality of data regeneration circuits 205-1 to 205-(*k*−1) may be embodied, for example, as a latch or a flip-flop, which operates in response to the clock signal CLK.

The first to Kth data regeneration circuits 205-1 to 205-(*k*−1) are respectively connected to the first to Kth bus segments, and the first to (K−1)th data regeneration circuits are respectively connected to the second to Kth bus segments.

A swing width (or range) of an input signal of each of the plurality of data regeneration circuits 205-1 to 205-*k* may be the same as a swing width of an output signal. For example, each of the input signal and the output signal may be a small swing signal.

According to an example embodiment, each of the plurality of data regeneration circuits 205-1 to 205-*k* may transmit respective signals (e.g., respective data of the plurality of bus segments) in one direction. According to another example embodiment, each of the plurality of data regeneration circuits 205-1 to 205-*k* may bi-directionally transmit signals (e.g., respective data of the plurality of bus segments). Each of the plurality of data regeneration circuits 205-1 to 205-*k* may include a function of processing the input signal.

Each of the plurality of address transmission circuits 207-1 to 207-*k* may sequentially latch the first address BADD in response to the clock signal CLK. Each of the plurality of address transmission circuits 207-1 to 207-k may be embodied, for example, as a latch or a flip-flop, which operates in response to the clock signal CLK.

A structure of each of the plurality of data regeneration circuits 205-1 to 205-k may be substantially the same as or similar to a structure of each of the plurality of address transmission circuits 207-1 to 207-k. For example, a timing of data transmitted by each of the plurality of data regeneration circuits 205-1 to 205-k and a timing of data transmitted by each of the plurality of address latches 207-2 to 207-k may be synchronized to each other.

Figure 3:
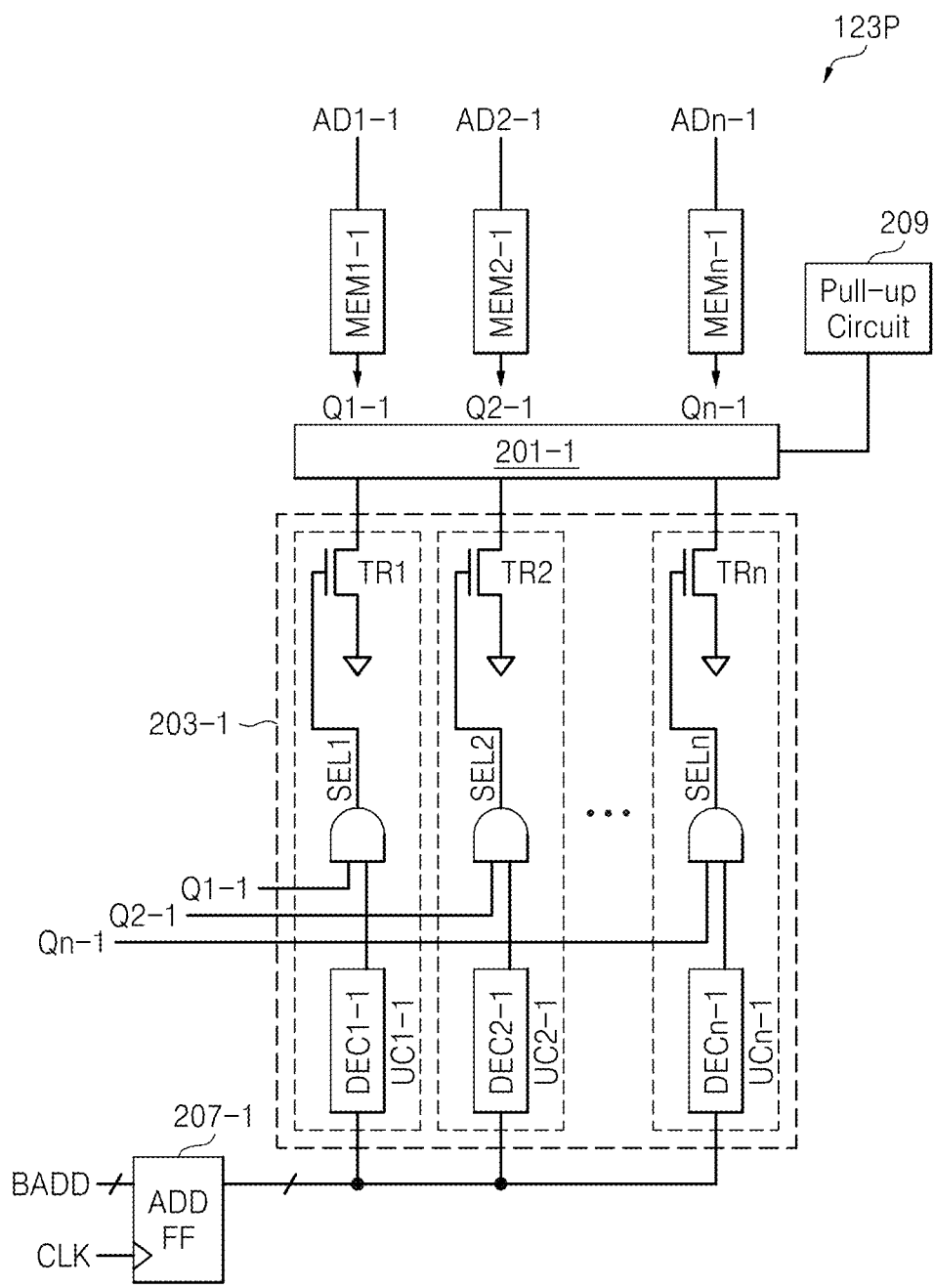
FIG. 3 is a block diagram illustrating a portion of the data transmission circuit illustrated in FIG. 2.

FIG. 3 is a block diagram illustrating a portion of the data transmission circuit illustrated in FIG. 2. Referring to FIGS. 2 and 3, a portion 123P of the data transmission circuit 123 includes configuration elements necessary for an operation of the bank 203-1.

Each of the plurality of memories MEM1-1 to MEMn-1 receives and stores each of the parallel digital signals AD1-1 to ADn-1, and outputs each of output signals Q1-1, Q2-1, ..., Qn-1, to the bank 203-1. The bank 203-1 includes a plurality of unit cells UC1-1 to UCn-1.

Each of the plurality of unit cells UC1-1 to UCn-1 includes a corresponding one of a plurality of decoders DEC1-1 to DECn-1, a corresponding one of a plurality of logic gates outputting a corresponding one of a plurality of selection signals SEL1 to SELn, and a corresponding one of a plurality of switches TR1 to TRn. Each of the plurality of decoders DEC1-1 to DECn-1 decodes the first address BADD output from the address transmission circuit 207-1 and outputs the decoded signal.

Each of the logic gates outputs each of the selection signals SEL1 to SELn based on each of the decoded signals output from each decoder DEC1-1 to DECn-1 and each of a plurality of output signals Q1-1, Q2-1, ..., Qn-1 output from each of the respective memories MEM1-1 to MEMn-1.

Each of the switches TR1 to TRn connects a bus segment 201-1 to a ground according to a level of each of the selection signals SEL1 to SELn. Each of the switches TR1 to TRn may be embodied, for example, as a MOS transistor. For example, according to an operation timing of the switches TR1 to TRn, the parallel digital signals AD1-1 to ADn-1 may be converted into serial signals, and the serial signals may be transmitted through the bus segment 201-1 at an appropriate timing.

A pull-up circuit 209 may pull-up the bus segment 201-1 to a specific voltage, e.g., a power voltage having a high level. For example, the pull-up circuit 209 may be embodied, for example, using resistance or a diode connected between a power supplying the power voltage and the bus segment 201-1.

Figure 4:
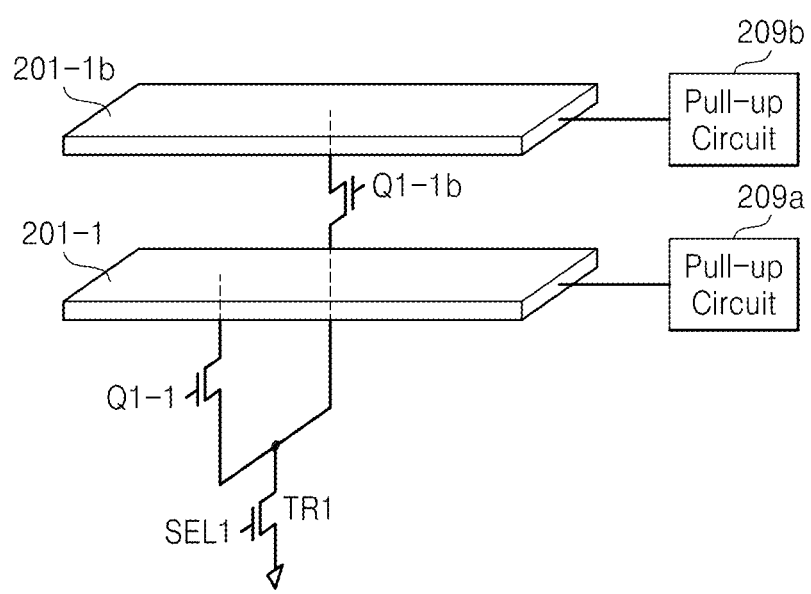
FIG. 4 is a conceptual diagram for describing an operation of a unit cell illustrated in FIG. 3.

FIG. 4 is a conceptual diagram for describing an operation of a unit cell illustrated in FIG. 3. A pair of bus segments 201-1 and 201-1b transmitting differential signals, a plurality of switches, and pull-up circuits 209a and 209b are illustrated in FIG. 4.

Each of the plurality of switches performs a function of pulling down each of the pair of bus segments 201-1 and 201-1b, and each of the pull-up circuits 209a and 209b has a function of pulling-up each of the pair of bus segments 201-1 and 201-1b. For example, it may be understood that the pull-up circuit 209 of FIG. 3 conceptually illustrates the pull-up circuits 209a and 209b of FIG. 4 and a bus segment 201-1 of FIG. 3 conceptually illustrates a pair of bus segments 201-1 and 201-1b of FIG. 4.

It is assumed that a memory MEM1-1 outputs differential output signals Q1-1 and Q1-1b, and each of the pull-up circuits 209a and 209b outputs a pull-up voltage, e.g., a power voltage. According to some example embodiments, a pull-up voltage of each of the pull-up circuits 209a and 209b may be the same as each other or different from each other.

According to a selection signal SEL1, differential output signals Q1-1 and Q1-1b, and pull-up voltages output from the pull-up circuits 209a and 209b, a signal level of each of the pair of bus segments 201-1 and 201-1b is determined.

For example, when each of the pull-up circuits 209a and 209b supplies a specific voltage to each of the bus segments 201-1 and 201-1b, an output signal Q1-1 is at a high level, a complementary output signal Q1-1b is at a low level, and a selection signal SEL1 is at a high level, the bus segment 201-1 generates a signal having a low level and the bus segment 201-1b generates a signal having a high level. Levels of the signal of the bus segment 201-1 and the signal of the bus segment 201-1b are differential.

Figure 5:
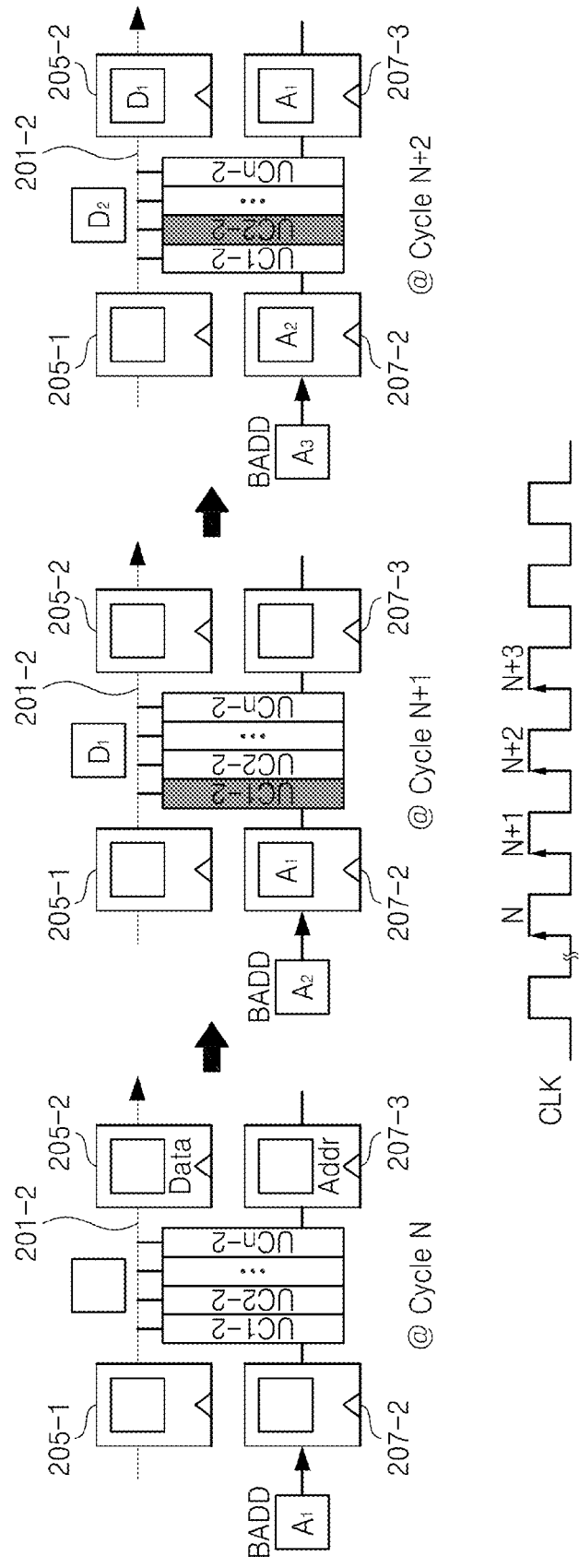
FIG. 5 is a conceptual diagram for describing a process of transmitting data and an address in the data transmission circuit of FIG. 1.

FIG. 5 is a conceptual diagram for describing a process of transmitting data and an address in the data transmission circuit of FIG. 1. Referring to FIGS. 1 to 5, in response to an $N^{th}$ rising edge of a clock signal CLK, the first address BADD having a first value A1 is input to an input terminal of the address transmission circuit 207-2.

In response to an $(N+1)^{th}$ rising edge of the clock signal CLK, the first address BADD having a second value A2 is input to the input terminal of the address transmission circuit 207-2, and the address transmission circuit 207-2 latches the first address BADD having the first value A1. For example, a unit cell UC1-2 generates data D1 in response to the first address BADD having the first value A1 output from the address transmission circuit 207-2 and an output signal of a memory MEM1-2.

In response to an $(N+2)^{th}$ rising edge of the clock signal CLK, the first address BADD having a third value A3 is input to the input terminal of the address transmission circuit 207-2, and the address transmission circuit 207-2 latches the first address BADD having the second value A2. For example, a unit cell UC2-2 generates data D2 in response to the first address BADD having the second value A2 output from the address transmission circuit 207-2 and an output signal of a memory MEM2-2.

In response to an $(N+2)^{th}$ rising edge of the clock signal CLK, the data regeneration circuit 205-2 latches data D1, and the address transmission circuit 207-3 latches the first address BADD having the first value A1. Accordingly, the data D1 and the first address BADD having the first value A1 are simultaneously output. Thus, the digital processing unit 150 or other data processing units may recognize that the data D1 relates to the first address BADD having the first value A1.

In response to an $(N+3)^{th}$ rising edge of the clock signal CLK, the data regeneration circuit 205-2 latches data D2, and the address transmission circuit 207-3 latches the first address BADD having the second value A2. Accordingly, the data D2 and the first address BADD having the second value A2 are simultaneously output. Thus, the digital processing unit 150 or other data processing units may recognize that the data D2 relates to the first address BADD having the second value A2.

Figure 6:
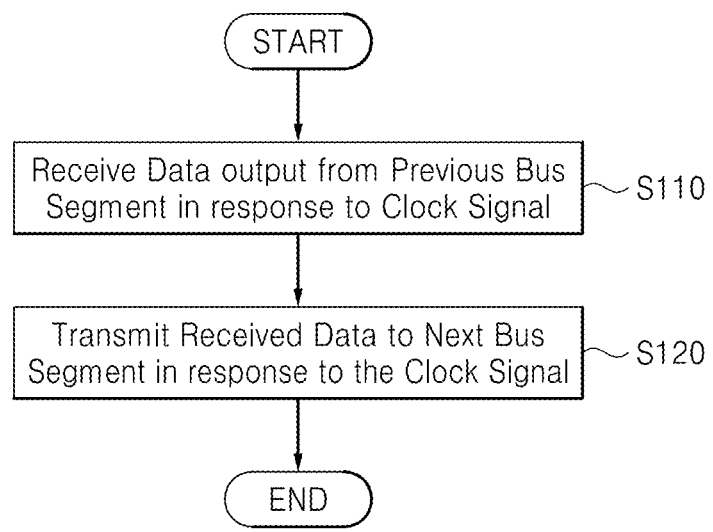
FIG. 6 is a flowchart describing an operation of the data transmission circuit illustrated in FIG. 2.

FIG. 6 is a flowchart describing an operation of the data transmission circuit illustrated in FIG. 2. Referring to FIGS. 1 to 6, a current data regeneration circuit 205-1 receives data output from a previous bus segment 201-1 in response to a clock signal CLK (S110).

The current data regeneration circuit 205-1 transmits received data to a next bus segment 201-2 in response to a clock signal CLK (S120). Data of the first bus segment 201-1 is sequentially transmitted to subsequent bus segments 201-2 to 201-k through the data regeneration circuits 205-1 to 205-(k−1) operating in response to a clock signal CLK, and data of a last bus segment 201-k is transmitted to a last data regeneration circuit 205-$k$ in response to a clock signal CLK, and data of the last data regeneration circuit 205-$k$ is transmitted to the digital processing unit 150 as first data BDATA.

Figure 7:
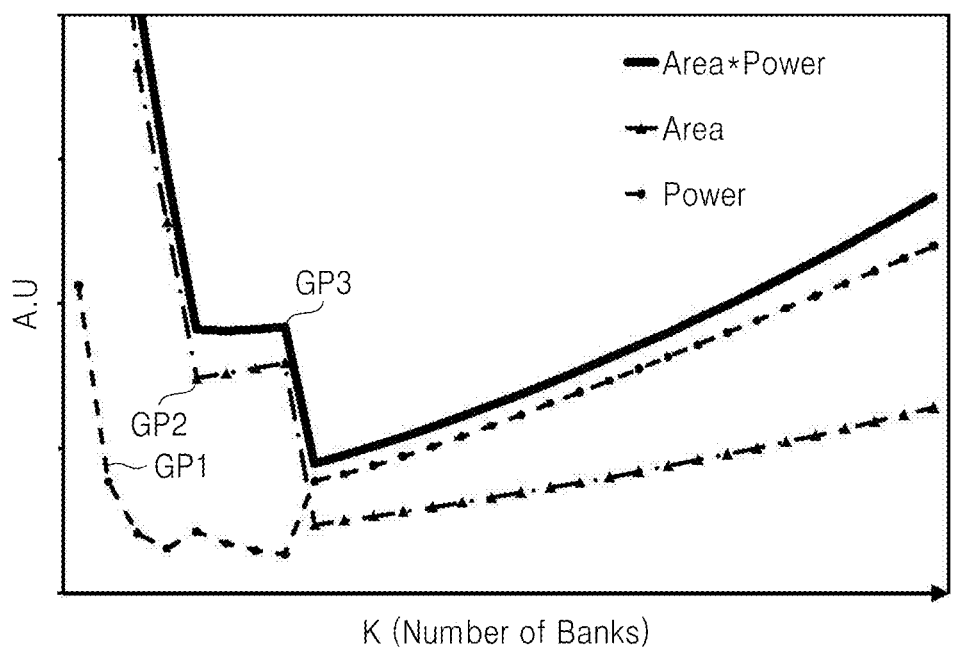
FIG. 7 is a graph illustrating the number of banks embodied in the data transmission circuit of the image sensor according to an example embodiment and accompanying efficiency.

FIG. 7 is a graph illustrating the number of banks embodied in the data transmission circuit of the image sensor according to an example embodiment and accompanying efficiency. A horizontal axis represents the number of banks, and a vertical axis represents arbitrary unit (A, U).

A graph of FIG. 7 represents efficiency according to the number of banks in terms of, e.g., power consumption (GP1), area (GP2), and a multiplication (GP3) between the area (GP2) and the power (GP1). As illustrated in FIG. 7, the number of banks which may be included in each data transmission circuit 123 and 133 of FIG. 1 may be appropriately selected.

Figure 8:
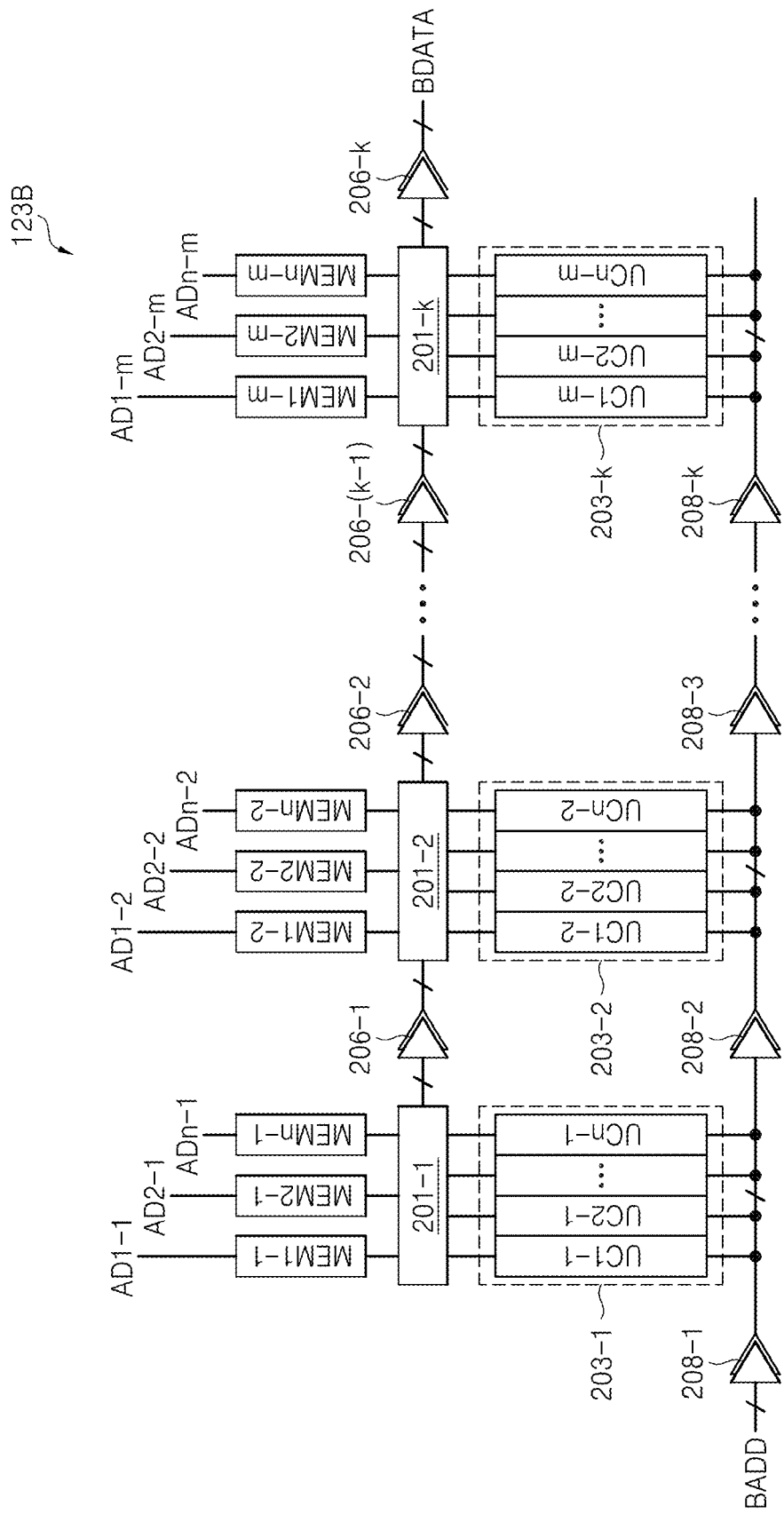
FIG. 8 is a block diagram illustrating another example embodiment of the data transmission circuit illustrated in FIG. 1.

FIG. 8 is a block diagram illustrating another example embodiment of the data transmission circuit illustrated in FIG. 1. Except data regeneration circuits 206-1 to 206-$k$ and address transmission circuits 208-1 to 208-$k$, a structure and an operation of the data transmission circuit 123A of FIG. 2 are substantially the same as or similar to a structure and an operation of a data transmission circuit 123B of FIG. 8.

Each of the data regeneration circuits 206-1 to 206-$k$ may be embodied, for example, as a buffer, a sense amplifier, or a logic gate. The logic gate may be embodied, for example, in AND gate, NOT gate, OR gate, NAND gate, NOR gate, EX-OR gate, or EX-NOR gate. For example, the buffer may be embodied as an analog buffer.

Each of the address transmission circuits 208-1 to 208-$k$ may be embodied to be substantially the same as or similar to each of the data regeneration circuits 206-1 to 206-$k$.

As described referring to FIGS. 1 to 8, the data transmission circuit 123 of the image sensor 100 includes a plurality of bus segments 201-1 and 201-$k$ and a plurality of data regeneration circuits 205-1 to 205-($k$–1) or 206-1 to 206-($k$–1), which connect the plurality of bus segments 201-1 and 201-$k$.

As illustrated in FIG. 2, each of the plurality of data regeneration circuits 205-1 to 205-$k$ may be embodied as a synchronous circuit operating in response to a clock signal CLK, e.g., a latch or a flip-flop.

As illustrated in FIG. 8, each of the plurality of data regeneration circuits 206-1 to 206-$k$ may be embodied, for example, as a buffer, a sense amplifier, or a logic gate.

Figure 9:
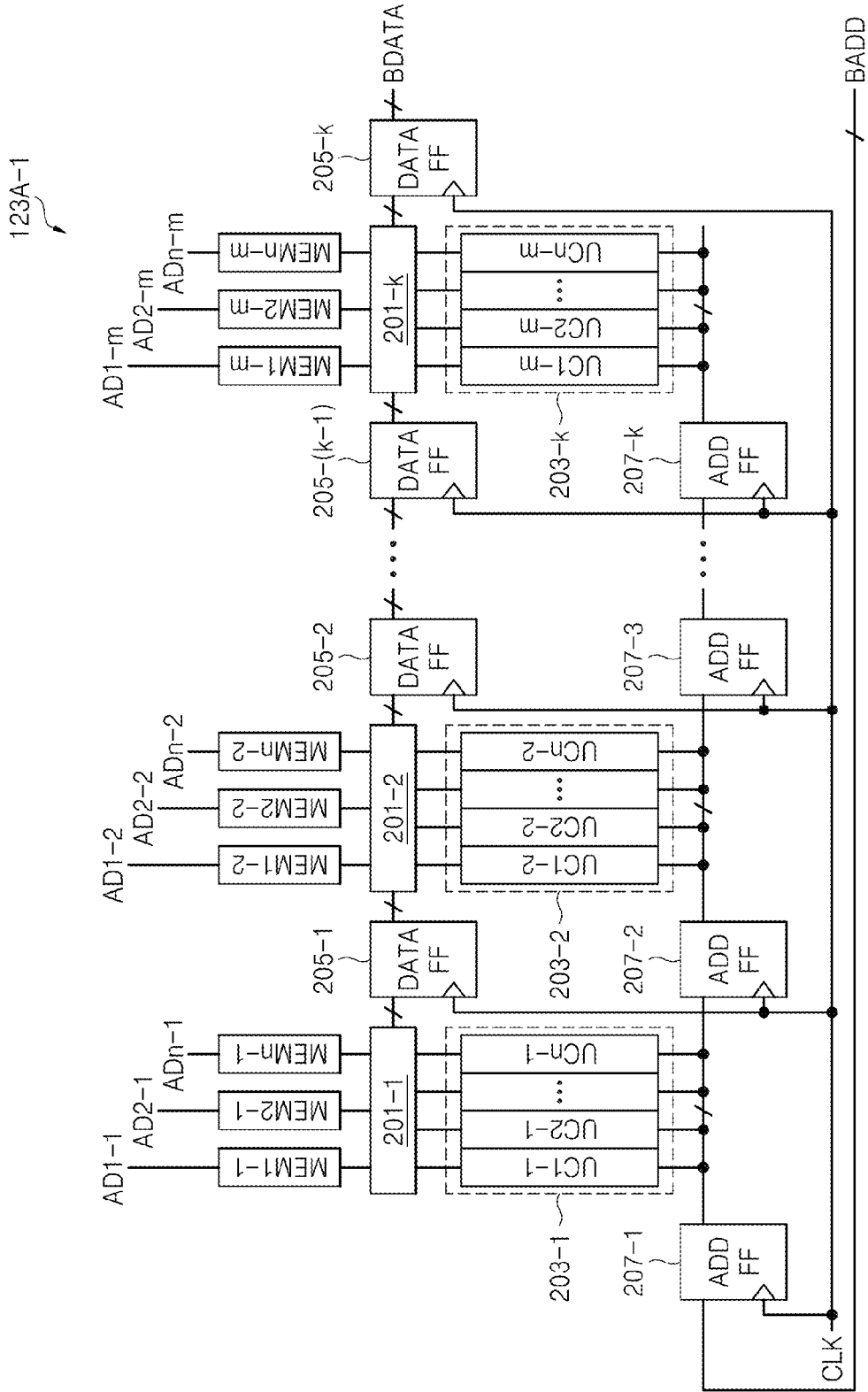
FIG. 9 is a block diagram illustrating still another example embodiment of a data transmission circuit illustrated in FIG. 1.

FIG. 9 is a block diagram illustrating still another example embodiment of a data transmission circuit illustrated in FIG. 1.

Except a signal line or a channel transmitting a first address BADD, a structure and an operation of the data transmission circuit 123A of FIG. 2 are substantially the same as or similar to a structure and an operation of a data transmission circuit 123A-1 of FIG. 9. According to example embodiments, synchronous or asynchronous buffer(s) may be inserted in the signal line. In the view of direction of data, the control signal (e.g., the clock signal CLK) or the first address BADD may be propagated in same direction as the data. Accordingly, latency difference for accessing different positions may be mitigated.

Figure 10:
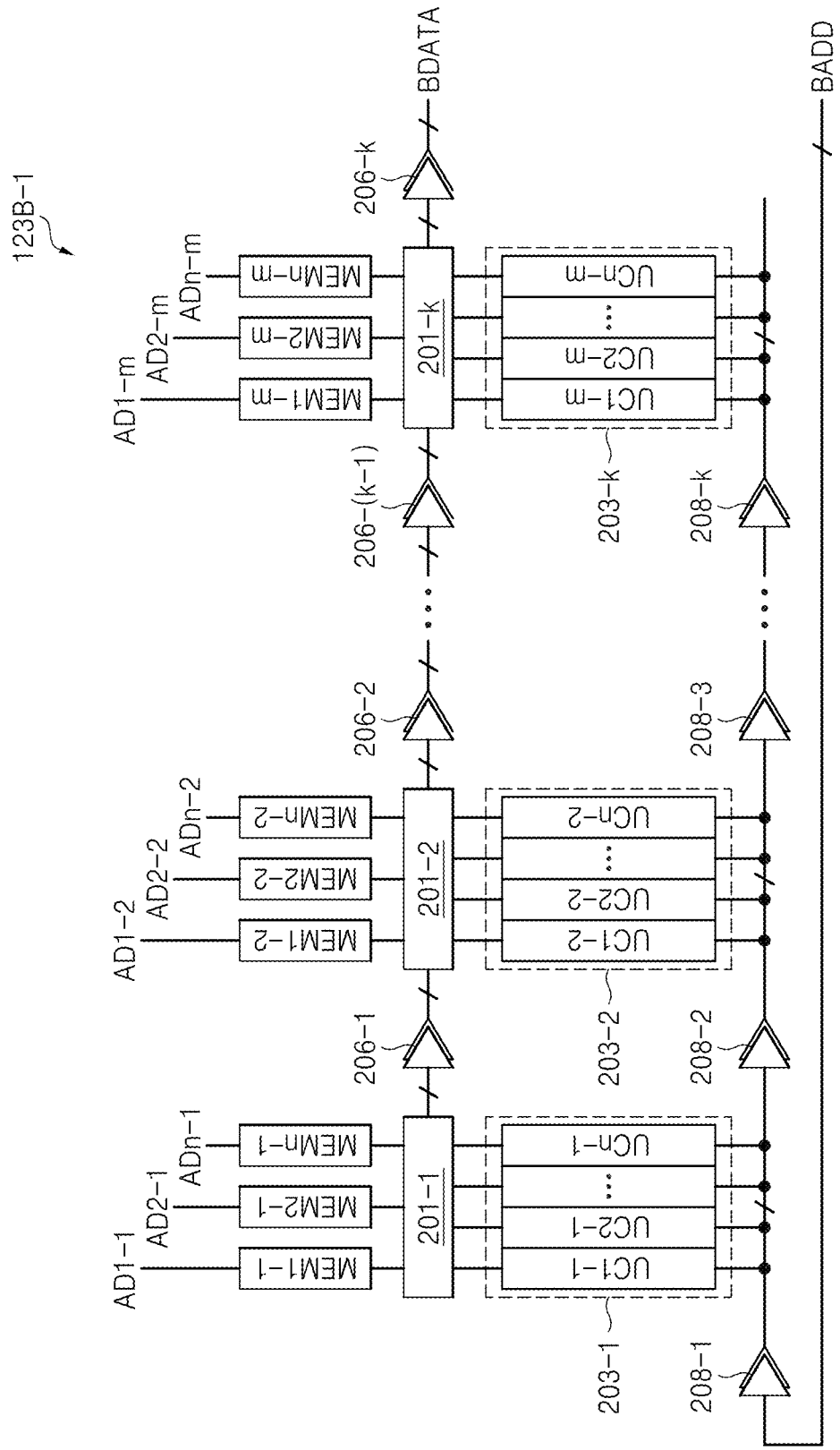
FIG. 10 is a block diagram illustrating yet another example embodiment of the data transmission circuit illustrated in FIG. 1.

FIG. 10 is a block diagram illustrating yet another example embodiment of the data transmission circuit illustrated in FIG. 1.

Except a signal line or a channel transmitting a first address BADD, a structure and an operation of the data transmission circuit 123B of FIG. 8 are substantially the same as or similar to a structure and an operation of a data transmission circuit 123B-1 of FIG. 10. According to example embodiments, synchronous or asynchronous buffer(s) may be inserted in the signal line. In the view of direction of data, the control signal (e.g., the first control signal CLK) or the first address BADD may be propagated in same direction as the data. Accordingly, latency difference for accessing different positions may be mitigated.

Figure 11:
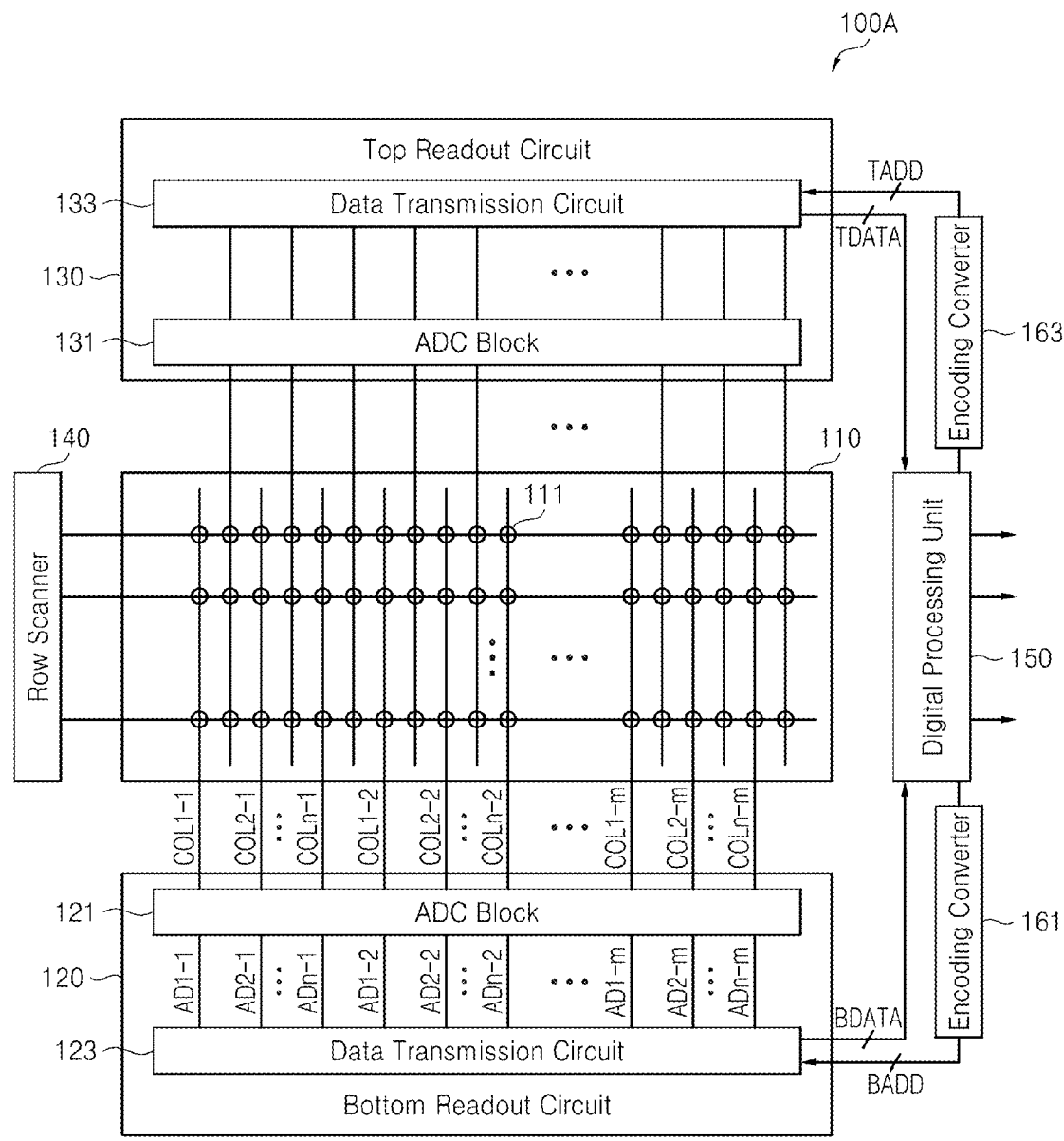
FIG. 11 is a block diagram of an image sensor according to another example embodiment.

FIG. 11 is a block diagram of an image sensor according to another example embodiment.

Except encoding converters 161 and 163, a structure and an operation of the image sensor 100 of FIG. 1 are substantially the same as or similar to a structure and an operation of the image sensor 100A of FIG. 11.

The encoding converter 161 may encode and convert a first format code into a second format code. For example, the first format code may be one-hot, binary code, or thermometer code, and the second format code may be gray code BADD. The encoding converter 163 may encode and convert a first format code into a second format code. For example, the first format code may be one-hot, binary code, or thermometer code, and the second format code may be gray code TADD. Accordingly to example embodiments, the encoding converters 161 and 163 may be embodied inside a digital processing unit 150.

Figure 12:
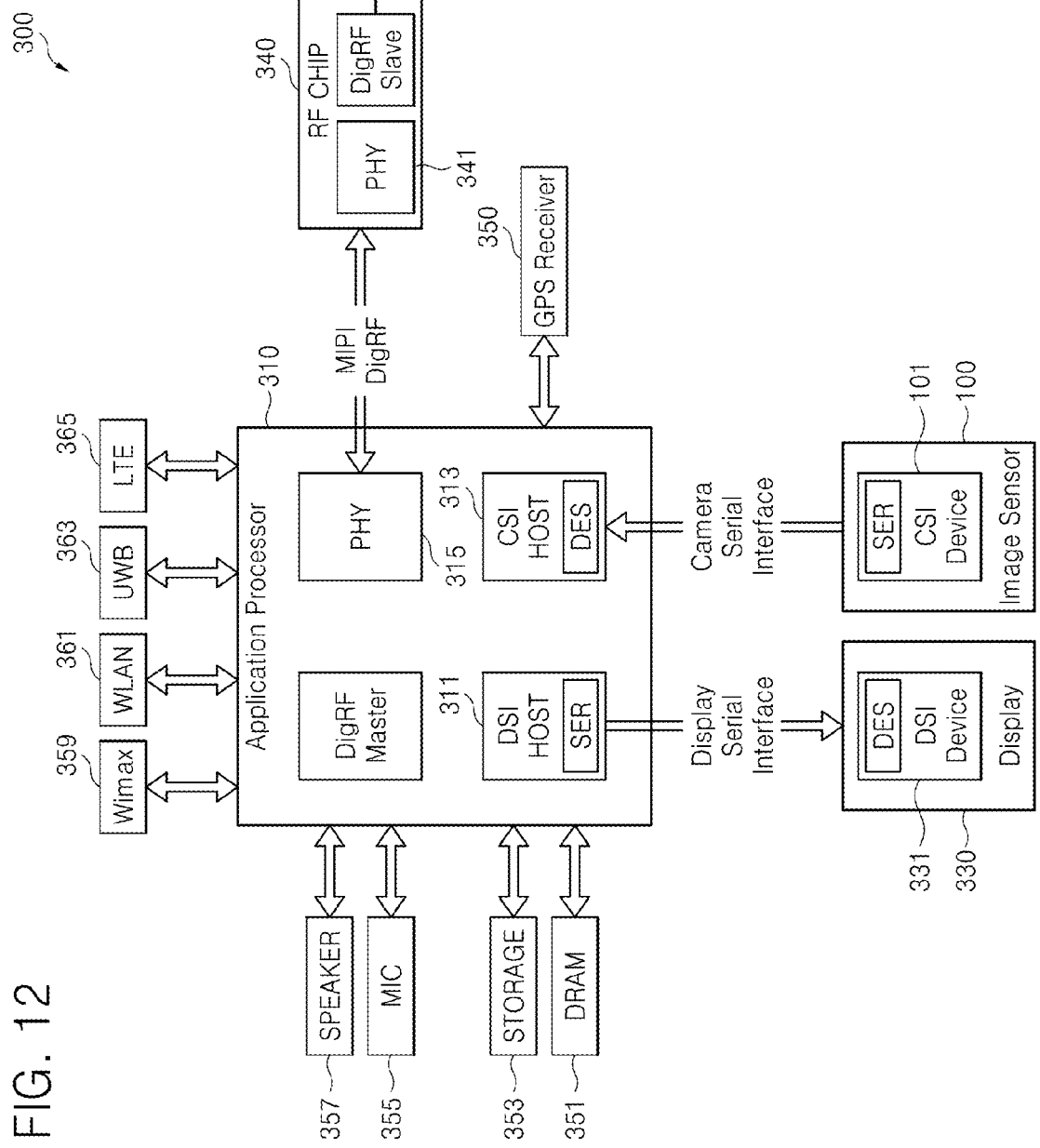
FIG. 12 is a block diagram of a data processing system including the image sensor according to example embodiments.

FIG. 12 is a block diagram of a data processing system including the image sensor according to example embodiments. Referring to FIG. 12, a data processing system 300 may be embodied as a portable electronic device which may use or support, for example, a Mobile Industry Processor Interface (MIPI) interface. The portable electronic device may be, e.g., a mobile phone, a personal digital assistant (PDA), a portable multimedia player (PMP), a mobile internet device (MID), a wearable computer, or a smart phone.

The data processing system 300 includes an application processor (AP) 310, the image sensor 100, and a display 330.

A CSI host 313 embodied in the AP 310 may perform a serial communication with a CSI device 101 of the image sensor 100 through a camera serial interface (CSI). As illustrated, a de-serializer DES may be embodied in the CSI host 313, and a serializer SER may be embodied in the CSI device 101.

A structure and an operation of the image sensor 100 are described referring to FIGS. 1 to 8.

A DSI host 311 embodied in the AP 310 may perform a serial communication with the DSI device 331 of the display 330 through a display serial interface (DSI). As illustrated, a serializer (SER) may be embodied in the DSI host 311, and a de-serializer (DES) may be embodied in the DSI device 331.

The data processing system 300 may further include a radio frequency (RF) chip 340 which may communicate with the AP 310. A physical layer (PHY) 315 of an image processing system 300 may transmit or receive data to/from a PHY 341 of the RF chip 340 according to MIPI DigRF interface standards.

The data processing system 300 may further include a GPS receiver 350, a DRAM 351, a storage 353, a mike 355, and a speaker 357. The data processing system 300 may communicate with an external device using a wireless communication protocol, e.g., Worldwide Interoperability for Microwave Access (WIMAX) 359, Wireless Local Area Network (WLAN) 361, Ultra-WideBand (UWB) 363, or Long Term Evolution (LTE) 365.

A data transmission circuit of an image sensor according to example embodiments of the present inventive concepts includes a plurality of bus segments each divided from each other. Thus, a RC time constant of the data transmission circuit is smaller than a RC time constant of the data transmission circuit of a conventional image sensor including one bus. Accordingly, a data transmission circuit of an image sensor according to example embodiments of the present inventive concepts may transmit data fast.

Although a few example embodiments have been shown and described, it will be appreciated by those skilled in the art that changes may be made in these example embodiments without departing from the principles and spirit of the example embodiments, the scope of which is defined in the appended claims and their equivalents.

What is claimed is:

1. A data transmission circuit of an image sensor comprising:
   first to Kth bus segments arranged in series; and
   first to Kth data regeneration circuits arranged in series and respectively connected to the first to Kth bus segments, and the first to (K−1)th data regeneration circuits respectively connected to the second to Kth bus segments,
   wherein each of the first to (K−1)th data regeneration circuits is configured to transmit data of a previous one of the first to Kth bus segments to a next one of the first to Kth bus segments in response to a control clock signal.

2. The data transmission circuit of claim 1, wherein each of the first to Kth data regeneration circuits is one of a buffer and a logic gate.

3. The data transmission circuit of claim 1, wherein each of the first to Kth data regeneration circuits is a synchronous circuit operating in response to a clock signal.

4. The data transmission circuit of claim 1, wherein the Kth data regeneration circuit is configured to output data of the Kth bus segment of the first to Kth bus segments as serial data.

5. The data transmission circuit of claim 1, further comprising:
   first to Kth address transmission circuits respectively transmitting addresses related to data transmitted through the first to Kth bus segments, the first to Kth address transmission circuits connected to each other in series.

6. The data transmission circuit of claim 5, wherein each of the first to Kth address transmission circuits is one of a buffer and a logic gate.

7. The data transmission circuit of claim 5, wherein each of the first to Kth address transmission circuits is a synchronous circuit operating in response to a clock signal.

8. The data transmission circuit of claim 5, wherein a transmission timing of the data and a transmission timing of the address are synchronized with each other.

9. The data transmission circuit of claim 1, wherein each of the first to Kth data regeneration circuits transmits respective data of the first to Kth bus segments in one direction.

10. The data transmission circuit of claim 1, wherein each of the plurality of data regeneration circuits bi-directionally transmits respective data of the first to Kth bus segments.

11. A portable electronic device comprising:
   an image sensor including,
      a pixel array,
      an analog-to-digital converter circuit configured to convert an analog pixel signal output from the pixel array to a digital signal, and
      a data transmission circuit configured to transmit data related to the digital signal,
      the data transmission circuit having,
         first to Kth bus segments arranged in series, and
         first to Kth data regeneration circuits arranged in series and respectively connected to the first to Kth bus segments and the first to (K−1)th data regeneration circuits respectively connected to the second to Kth bus segments; and
   a processor configured to control an operation of the image sensor,
   wherein each of the first to (K−1)th data regeneration circuits is configured to transmit data of a previous one of the first to Kth bus segments to a next one of the first to Kth bus segments in response to a control clock signal.

12. The portable electronic device of claim 11, wherein each of the first to Kth data regeneration circuits is one of a buffer, a logic gate, and a synchronous circuit operating in response to a clock signal.

13. The portable electronic device of claim 11, further comprising:
   first to Kth address transmission circuits respectively transmitting addresses related to data transmitted through the first to Kth bus segments, the first to Kth address transmission circuits connected to each other in series.

14. The portable electronic device of claim 11, wherein data of the first to Kth bus segments are sequentially transmitted through the first to Kth data regeneration circuits.

15. The portable electronic device of claim 11, wherein data of the first to Kth bus segments are sequentially transmitted through the first to Kth data regeneration circuits operating in response to a clock signal.

16. An image sensor comprising:
   a pixel array;
   an analog-to-digital converter configured to convert an analog pixel signal output from the pixel array to a digital signal; and
   a data transmission circuit configured to transmit data related to the digital signal, the data transmission circuit including,
      first to Kth bus segments arranged in series, and
      first to Kth data regeneration circuits arranged in series and respectively connected to the first to Kth bus segments and the first to (K−1)th data regeneration circuits respectively connected to the second to Kth bus segments,
   wherein each of the first to (K−1)th data regeneration circuits is configured to transmit data of a previous one of the first to Kth bus segments to a next one of the first to Kth bus segments in response to a control clock signal.

17. The image sensor of claim 16, further comprising:
   a digital processing unit configured to generate addresses and configured to process data serially output from the data transmission circuit.

18. The image sensor of claim 17, further comprising:
   an encoding converter between the digital processing unit and the data transmission circuit, the encoding converter configured to encode and convert a first format code into a second format code.

19. The image sensor of claim 18, wherein the first format code is one of one-hot, binary code, gray code, and thermometer code, and the second format code is the other one of the one-hot, the binary code, the gray code, and the thermometer code.

20. The image sensor of claim 16, wherein a sum of lengths of the first to Kth bus segments is smaller than a length of the pixel array in an arrangement direction of the first to Kth bus segments.

* * * * *